the 
United States Patent [19]

Dudley

[11] Patent Number: 4,650,117

[45] Date of Patent: Mar. 17, 1987

[54] SELF-LEVELING BOOM ASSEMBLY

[75] Inventor: Wayne C. Dudley, Parkersburg, Iowa

[73] Assignee: Top-Air Manufacturing, Inc., Parkersburg, Iowa

[21] Appl. No.: 841,890

[22] Filed: Mar. 20, 1986

[51] Int. Cl.[4] ............................................. A01G 25/09
[52] U.S. Cl. ................................................... 239/168
[58] Field of Search ................................. 239/166–168

[56] References Cited

FOREIGN PATENT DOCUMENTS

| | | | |
|---|---|---|---|
| 486855 | 9/1977 | Australia | 239/168 |
| 2046563 | 11/1980 | United Kingdom | 239/167 |
| 1594331 | 7/1981 | United Kingdom | 239/167 |

*Primary Examiner*—Andres Kashnikow
*Attorney, Agent, or Firm*—G. Brian Pingel; Kent A. Herink

[57] ABSTRACT

A self-leveling boom assembly adapted for mounting on one end of a vehicle. The assembly includes a boom support that is adapted for attachment to the rear of the vehicle and has at least two spaced apart horizontally aligned attachment members, an elongated boom with a center section formed of a frame including vertically spaced apart upper and lower horizontally extended beam members connected together by at least two brace members, and two oppositely inclined support arms for pivotally connecting the lower beam member of the center boom section to the boom support.

6 Claims, 4 Drawing Figures

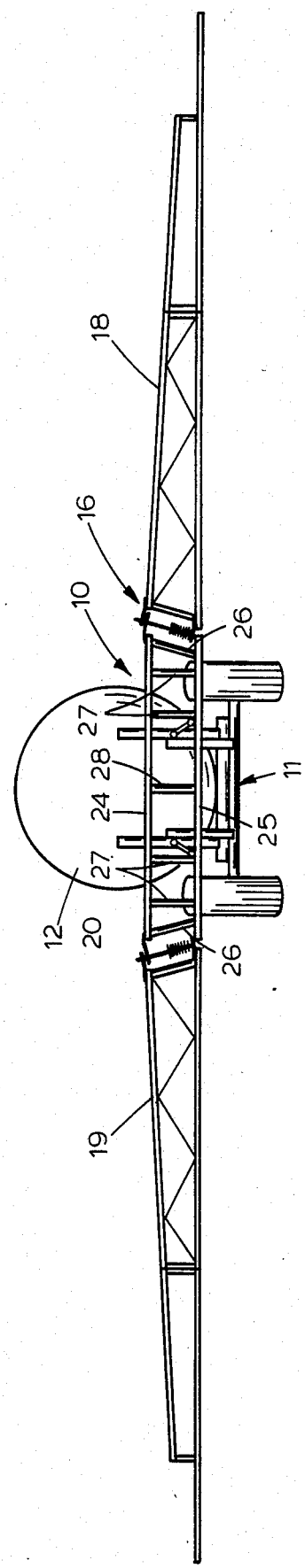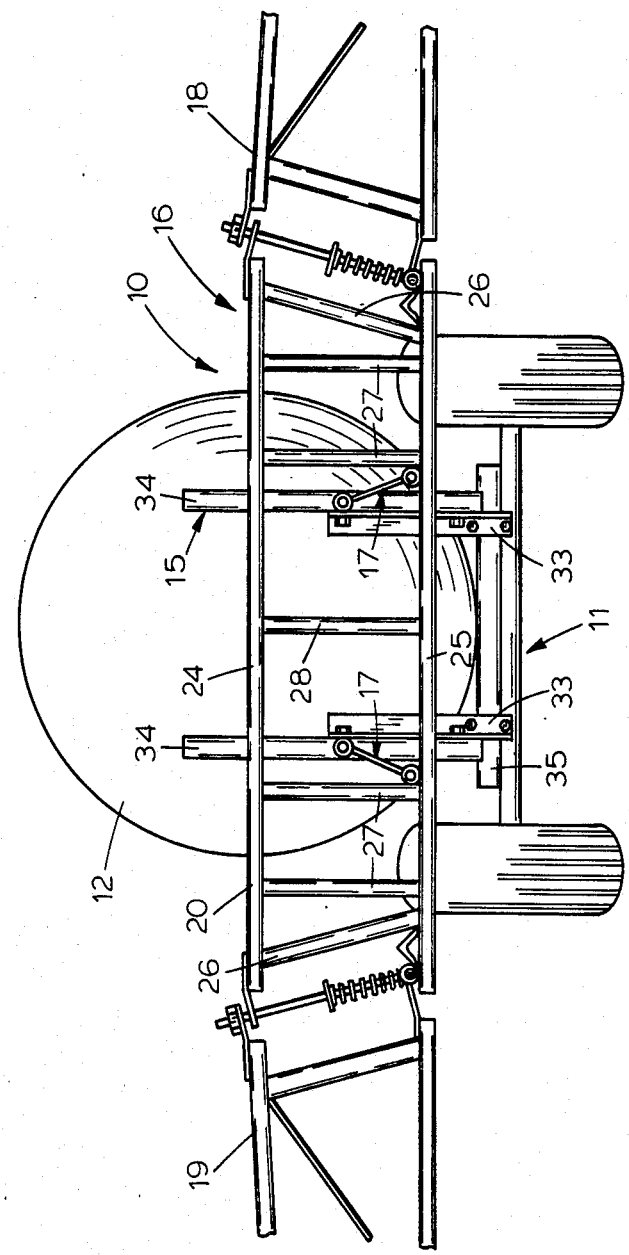
FIG. 1
FIG. 2

SELF-LEVELING BOOM ASSEMBLY

BACKGROUND OF THE INVENTION

1. Field of the Invention

The present invention relates in general to boom assemblies employed in spraying agricultural crops and more specifically, to such boom assemblies that are adapted to compensate for variations in the terrain over which they travel.

2. Description of the Prior Art

Standard equipment presently employed for spraying chemical herbicides, pesticides or the like on agricultural crops includes a vehicle for carrying a chemical storage tank and a spray boom extended transversely with respect to the vehicle. The spray boom has a plurality of spaced apart spray nozzles mounted along its length and a pump and associated spray lines transfer chemical from the storage tank to the spray nozzles.

To expedite spraying a field of agricultural crops, long spray booms are commonly employed and extend outwardly from the rear of the vehicle in cantilever fashion. A primary problem inherent in the use of such spray booms of extreme length is that the rough terrain often encountered by the vehicles upon which they are mounted makes it difficult to stabilize the booms and maintain an equal distance between the nozzles on the booms and the crops being sprayed.

Various devices for mounting a boom to a vehicle have been employed to increase the boom's stability, such as those disclosed in U.S. patents, U.S. Pat. Nos. 3,545,678, to Tangeman, 4,039,147 to Hugg and 4,197,999 to Lammers. The inventions of each of the above patents include parallel linked type systems for connecting the boom to an implement to improve the stability of the boom. The present invention provides an improved means over such prior art for controlling the spacing of the boom from the crop being sprayed as it travels over a varying terrain.

SUMMARY OF THE INVENTION

The present invention provides a self-leveling boom assembly adapted for mounting on one end of a vehicle and having a boom support means, an elongated boom, and a pair of oppositely inclined support arms for pivotally connecting the boom to the boom support means. The boom support means is adapted for attachment to the rear of the vehicle and includes at least two spaced apart horizontally aligned attachment means.

The boom has a center boom section and outer boom sections pivotally attached to opposite ends of the center section. Forming the center boom section is a frame with vertically spaced apart upper and lower horizontally extended beam members connected together by at least two brace members. The support arms are pivotally connected to the attachment means of the boom support means and to the lower beam member of said center boom section such that each of the support arms forms an angle of greater than 90 degrees with an outer end of said lower boom member when the rear wheels of the vehicle are supported by a horizontal plane.

The boom support means has a pair of horizontally spaced apart vertical support bars with cantilevered support axles for insertion into journal members to serve as the attachment means for said support arms. The support bars of said support means are positioned so that they are normally orthogonal to the lower beam member of said center boom section. At such time, each of the support bars, their associated support arms, and the lower beam member define a right triangle having angles of 30, 60 and 90 degrees.

It is an object of the present invention to provide a self-leveling boom assembly that compensates for variations in the terrain over which it travels to maintain the boom generally parallel to the crop of such terrain.

BRIEF DESCRIPTION OF THE DRAWINGS

FIG. 1 is a rear view of a preferred embodiment of the self-leveling boom assembly of the present invention in assembly relation with a portable tank trailer on which the assembly is mounted;

FIG. 2 is an enlarged rear view of the trailer and a center portion of the boom assembly of FIG. 1;

DESCRIPTION OF THE PREFERRED EMBODIMENT

The present invention provides a self-leveling boom assembly shown generally at 10 in FIG. 1 in assembly relation with a trailer 11 that carries a chemical storage container 12 and is attachable to a pulling vehicle by suitable means (not shown).

Figure 3:
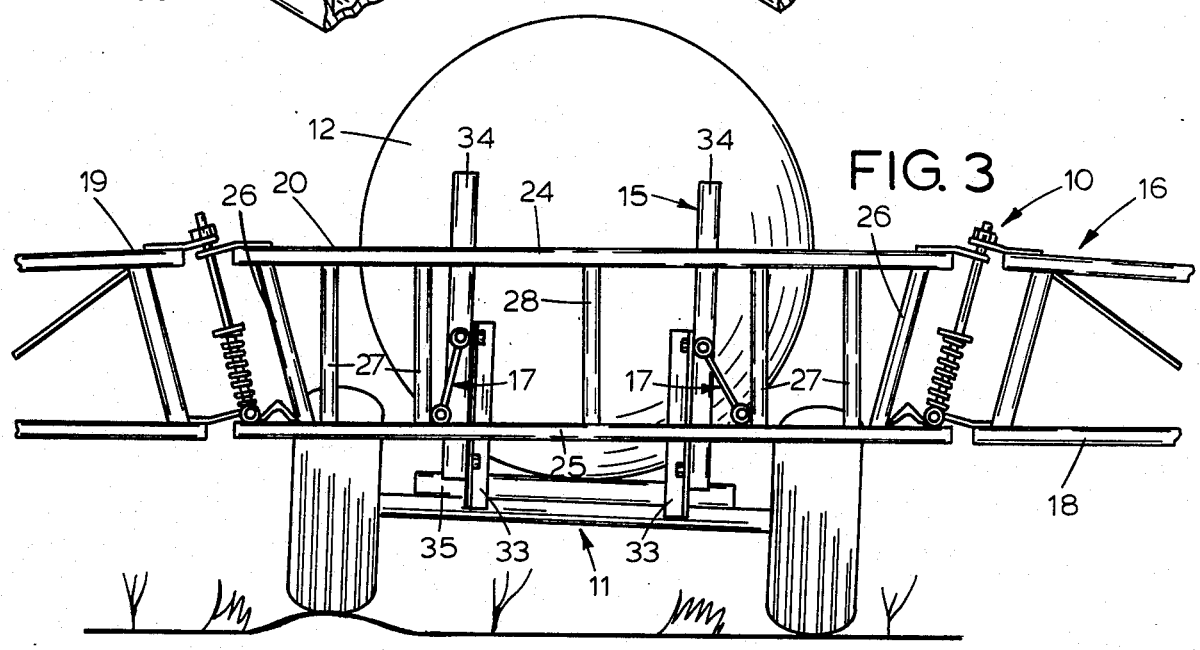
FIG. 3 is similar to FIG. 2 but shows the boom assembly in an adjusted position caused by one wheel of the trailer encountering elevated terrain.

As best shown in FIGS. 2 and 3, the boom assembly 10 includes a boom support means 15 attached to the rear of the trailer 11, an elongated boom 16, and support arms 17 for pivotally connecting the boom 16 to the boom support means 15. The boom assembly 10 is adapted to compensate for irregularities in the topography of the terrain over which the trailer 11 travels to maintain the boom 16 in a generally parallel alignment to the crop being sprayed by the assembly 10.

Referring again to FIG. 1, the boom 16 is formed of a pair of outer boom sections 18 and 19 that are substantially mirror images of one another and are pivotally connected to opposite ends of a center boom section 20. The center boom section 20 is of a frame type construction that includes vertically spaced apart upper and lower horizontally extended beam members 24 and 25, respectively, that are connected together by a plurality of brace members 26, 27 and 28.

Figure 4:
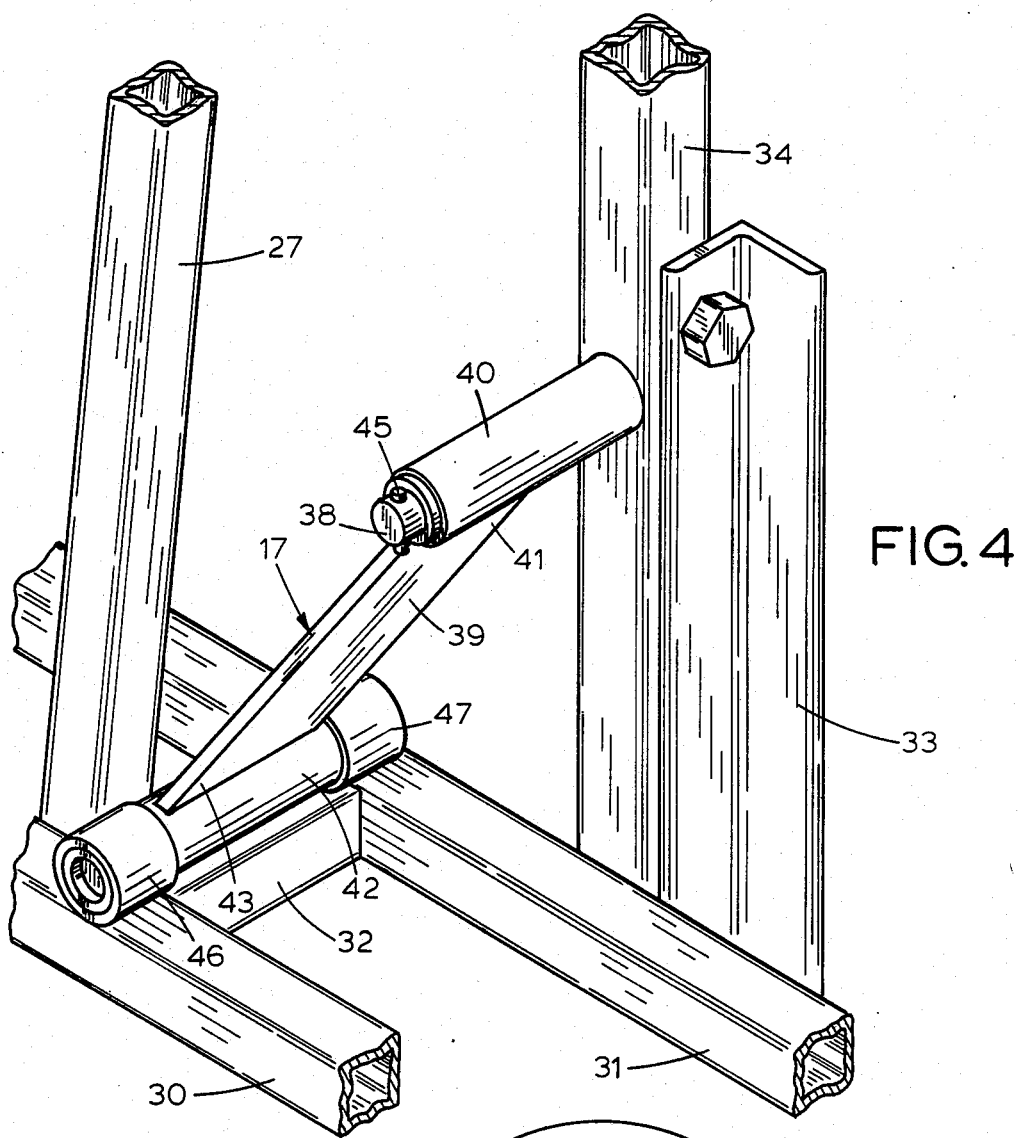
FIG. 4 is an enlarged perspective view showing the attachment of a center boom section to a boom support means by a support arm.

Preferably, the upper beam member 24 is formed of a single rigid, tubular square tubing, whereas the lower beam member 25 is formed of two parallel horizontally spaced apart rigid, square tubes 30 and 31, as indicated in FIG. 4, attached together at intervals along their length by connecting ribs 32 that lie transverse to the tubes 30 and 31.

The upper beam member 24 is in a position approximately 2 feet above the lower beam member tubes 30 and 31 and lies in a vertical plane generally bisecting the space between the tubes 30 and 31 so that the beam 24, tubes 30 and 31, and brace members 26, 27 and 28 form a generally A-frame type construction with the brace members 26 and 28 connected between the upper beam member 24 and the tube 31 and the brace members 27 connecting between the upper beam member 24 and the tube 30. In this way, the center boom section 20 is formed of a rigid frame type construction that is durable and yet relatively lightweight.

The specific construction of the boom support means 15 is not critical to the present invention and can take a variety of forms. One such form, as shown in FIGS. 2 and 3, includes a pair of spaced apart vertically oriented right angle beams 33 that are preferably bolted to a rear portion 35 of the trailer 11. Support struts 34, preferably in the form of tubular beams, as shown, or right angle beams are bolted in lengthwise fashion to the beams 33 to serve as support members for inter-connecting the center boom section 20 to the support means 15 by means of the support arms 17. The only critical structural configuration of the support means 15 is that each of the support members 34 includes a rearwardly protruding support axle 38, as indicated in FIG. 4, fixed to each support member 34, as by bolting, with the support axles 38 horizontally aligned to lie in a horizontal plane when the trailer 11 is traveling on a horizontal plane.

The support arms 17 are each formed of a rigid elongated flat extension member 39 having a tubular sleeve type member 40 fixed on its upper end 41 and a cylindrically shaped axle bar 42 fixed on its lower end 43. Each of the support arms 17 is attached to the boom support means 15 by the insertion of one of the support axles 38 into the tubular sleeve 40 to form a journal connection for pivotally attaching the support arms 17 to the boom support means 15. Preferably, a pin 45 is insertable through an outer end of each of the support axles 38 to retain the associated tubular sleeve 40 thereon.

The axle bar 42 of each support arm 17 is rotatably connected to the center boom section 20 by means of two spaced apart aligned, sleeve-type, bearing members 46 and 47 that are respectively secured to the lower beam member tubes 30 and 31 for receiving the outer ends of the axle bar 42. The sleeve members 46 and 47 are secured to the lower beam member 25 in an offset relation to the support axles 38 so that when the trailer 11 is traveling on a flat, horizontal plane, each support arm 17 extends downwardly and outwardly from the support axles 38 whereby the outer portions of lower beam member 25 of the center boom section 20 and the support arms 17 form an angle greater than 90 degrees and the support members 34, the support arms 17, and portions of the lower beam member 25 define a right triangle having angles of 30, 60 and 90 degrees.

It is this inclined relationship of the support arms 17 with the support members 34 and lower beam member 25 that is critical to the operation of the present invention to maintain the boom generally parallel to the ground although the trailer 11 encounters variations in the terrain over which it travels. When the trailer 11 is traveling on a flat, horizontal plane, the support arms 17 are a mirrored reflection of one another with respect to their alignment with the lower beam member 25 to prevent side-to-side swaying of the boom 16 and maintaining it in a horizontal relationship to the ground. However, as illustrated by FIG. 3, when the trailer 11 encounters irregularities in the terrain on which it travels, the support arms 17 permit the boom 16 to tilt with respect to the trailer 11 to maintain the boom generally parallel to the ground.

Thus the present invention provides a new and improved self-leveling boom assembly that is relatively simplistic in construction and operation, but yet operates in an efficient manner to maintain the boom 16 in a generally horizontal alignment with the ground over which it travels. Although the present invention has been described with reference to the preferred embodiment 10, it should be understood by those skilled in the art that various modifications can be made in the general construction of the assembly 10, as shown, such as variations in the frame type construction of the center boom section 20, the support means 15 and the support arm 17, and yet still fall within the scope of this invention as defined by the appended claims.

I claim:

1. A self-leveling boom assembly adapted for mounting on one end of a vehicle, said assembly comprising:
   (a) a boom support means for attachment to the rear of the vehicle and having at least two horizontally spaced apart attachment means;
   (b) an elongated boom that extends transversely of said support means and has a center boom section and outer boom sections attached to opposite ends of the center section, said center section formed of a frame including vertically spaced apart upper and lower horizontally extended beam members connected together by at least two brace members;
   (c) two oppositely inclined support arms for pivotally connecting said attachment means of said support means to said lower beam member of said center boom section;
   (d) a pair of spaced apart journal means fixed on said lower beam member; and
   (e) said support arms each include an extension member having journal means on its opposite ends for cooperating with said attachment means on said support means and said journal means on said beam member for pivotally connecting said center boom section with said support means.

2. A self-leveling boom assembly as recited in claim 1 wherein said boom support means has a pair of horizontally spaced apart vertical support bars, each having a cantilevered support axle that serves as one of said attachment means.

3. A self-leveling boom assembly as recited in claim 2 wherein the support bars of said support means are normally positioned orthogonal to the lower beam member of said center boom section so that each of said support bars, an associated support arm and the lower beam member define a right triangle.

4. A self-leveling boom assembly as recited in claim 3 wherein said right triangle has angles of 30, 60 and 90 degrees.

5. A self-leveling boom assembly as recited in claim 1 wherein said support arms normally form an angle greater than 90 degrees with the outer portions of said lower beam member.

6. A self-leveling boom assembly as recited in claim 1 wherein said journal means on said lower beam member are located in a position offset from the attachment means of said support means.

* * * * *